United States Patent
Mukkavilli et al.

(10) Patent No.: US 7,330,701 B2
(45) Date of Patent: Feb. 12, 2008

(54) LOW COMPLEXITY BEAMFORMERS FOR MULTIPLE TRANSMIT AND RECEIVE ANTENNAS

(75) Inventors: Krishna Kiran Mukkavilli, San Diego, CA (US); Ashutosh Sabharwal, Houston, TX (US); Behnaam Aazhang, Houston, TX (US)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/533,248

(22) PCT Filed: Oct. 29, 2003

(86) PCT No.: PCT/US03/34414

§ 371 (c)(1),
(2), (4) Date: Oct. 17, 2005

(87) PCT Pub. No.: WO2004/040690

PCT Pub. Date: May 13, 2004

(65) Prior Publication Data

US 2006/0111148 A1    May 25, 2006

Related U.S. Application Data

(60) Provisional application No. 60/422,277, filed on Oct. 29, 2002.

(51) Int. Cl.
*H04B 1/00* (2006.01)
*H04B 7/00* (2006.01)

(52) U.S. Cl. ............ 455/69; 455/562.1; 342/368; 342/373; 342/377

(58) Field of Classification Search .......... 455/69, 455/562.1; 342/368, 373, 377
See application file for complete search history.

(56) References Cited

U.S. PATENT DOCUMENTS

| | | | |
|---|---|---|---|
| 5,933,457 A | 8/1999 | Hottinen | 375/316 |
| 6,584,302 B1 | 6/2003 | Hottinen et al. | 455/69 |
| 2002/0013130 A1* | 1/2002 | Kim et al. | 455/70 |
| 2003/0181170 A1 | 9/2003 | Sim | 455/101 |
| 2003/0185309 A1* | 10/2003 | Pautler et al. | 375/257 |
| 2004/0033791 A1 | 2/2004 | Schmidl et al. | 455/137 |

* cited by examiner

*Primary Examiner*—Nay Maung
*Assistant Examiner*—Tuan H. Nguyen
(74) *Attorney, Agent, or Firm*—Harrington & Smith, PC

(57) ABSTRACT

Beamforming systems having a few bits of channel state information fed back to the transmitter benefit from low complexity decoding structures and performances gains compared with systems that do not have channel state feedback. Both unit rank and higher rank systems are implemented. Substantial design effort may be avoided by following a method of using functions formulated for space-time systems with the change that the channel coherence time is equated to the number of transmit antennas and the number of antennas in the space-time formulation is fixed at one.

34 Claims, 6 Drawing Sheets

LOW COMPLEXITY BEAMFORMERS FOR MULTIPLE TRANSMIT AND RECEIVE ANTENNAS

CROSS-REFERENCE TO RELATED APPLICATION

This application claims priority to U.S. provisional patent application No. 60/422,277, filed on Oct. 29, 2002; and to PCT application PCT/US03/34414, filed on Oct. 29, 2003.

TECHNICAL FIELD

The field of the invention is telecommunications, in particular antenna systems for cellular systems.

BACKGROUND OF THE INVENTION

Various beamforming schemes for wireless systems equipped with multiple transmit and multiple receive antennas are known in the art. At present, space time coding schemes are currently proposed for multiple antenna systems.

FIG. 1, taken from U.S. Pat. No. 6,584,302, assigned to the assignee hereof, presents a transceiver that has a group of antenna elements 200-204 for transmitting and receiving. The transceiver is usually a base station but it can also be a subscriber equipment. The antenna with several elements can be an antenna array or some other kind of cluster of antenna elements. Referring to receiver 260, each signal received from each antenna 200-204 enters RF-means 206-210 that convert the radio frequency signal to baseband signals in a known manner. The signals are digitized in A/D-converters 212-216. The digital baseband signals are multiplied by coefficients $W_1$-$W_M$ that form the shape of the beam of the antenna in multipliers 218-222. The coefficients $W_1$-$W_M$ are digital complex numbers. The receiver searches for the values of the coefficients $W_1$-$W_M$ that produce the best reception. Antenna responses are calculated in an antenna response unit 224 for each antenna element. The antenna responses are ranked and a subset of the set of the antenna responses is selected in rank and select unit 226.

A response of an antenna element is similar to an impulse response and is calculated by using correlation. In the correlation a known pseudo-random spreading code is correlated with the received signal L times. L is the number of paths of the multipath propagated signal. After calculating one correlation value the spreading code is shifted by a time difference $\Delta T$, which can be the same as the duration of a chip.

In the transmitter 262 the subset comprising at least one antenna response is fed to a coefficient unit 230 that calculates the coefficients $a_1$-$a_m$ for each antenna element 200-204 transmitting a signal. The signal to be transmitted is multiplied by the coefficients using the multipliers 232-236. The signal weighted by the coefficients $a_1$-$a_M$ is then converted to an analog signal by D/A-converters 238-242. After that, the analog signals are converted to radio frequency signals in RF-means 244-248 and the radio frequency signals are transmitted by the antenna elements 200-204.

Low receiver complexity is one of the important design goals for downlink transmission where the handset (receiver) is constrained in its computational abilities.

It is well known that channel state information at the transmitter can enhance the system performance significantly. However, in practical systems, only partial channel information may be available at the transmitter due to the limited nature of the feedback resources.

Hence, it is important to design feedback based transmission schemes for the cases where partial channel information is available at the transmitter. Transmission schemes for single receive antenna systems utilizing quantized channel information have been developed, but are not satisfactory.

SUMMARY OF THE INVENTION

The invention relates to a design criterion and beamformer constructions, which make use of finite rate feedback in the system.

A feature of the invention is a beamforming scheme for wireless systems equipped with multiple transmit and multiple receive antennas.

Another feature of the invention is the use of mathematical formalism originally developed for unitary space-time constellations for a beamformer.

Another feature of the invention is the application of a beamformer construction that is equivalent to a spatial water-filling solution.

BEST MODE OF CARRYING OUT THE INVENTION

The beamforming schemes presented in this disclosure result in improved performance at provably lower computational complexity compared to the space time coding schemes currently proposed for multiple antenna systems. Low receiver complexity is one of the important design goals for downlink transmission where the handset (receiver) is constrained in its computational abilities.

It is well known that channel state information at the transmitter can enhance the system performance significantly. However, in practical systems, only partial channel information may be available at the transmitter due to the limited nature of the feedback resources. Hence, it is important to design feedback based transmission schemes for the cases where partial channel information is available at the transmitter. Transmission schemes for single receive antenna systems utilizing quantized channel information have been developed.

In this work, we present a design criterion and beamformer constructions which make use of finite rate feedback in the system. In the first part of this disclosure, we present a unit rank beamforming strategy for multiple transmit and multiple receive antenna systems. In the second part, we present an algorithm to extend the beamformer codebook constructions to mimic a spatial water-filling solution with a finite number of feedback bits. We will show that both the schemes result in better performance at lower decoding complexity compared to space time coding. In particular, we can show that unit rank beamforming schemes are useful when the transmission rate is small. In fact, we can show that the unit rank beamforming schemes result in significant performance gains over space time coding schemes when $2^{R/r}/t<1$, where R is the rate of transmission in bits/sec/Hz, r is the number of receive antennas and t is the number of transmit antennas. When this condition for unit rank beamforming is not met, i.e., for higher transmission rates, we propose higher rank beamforming schemes based on the spatial water-filling algorithm, using finite rate feedback.

Figure 1:
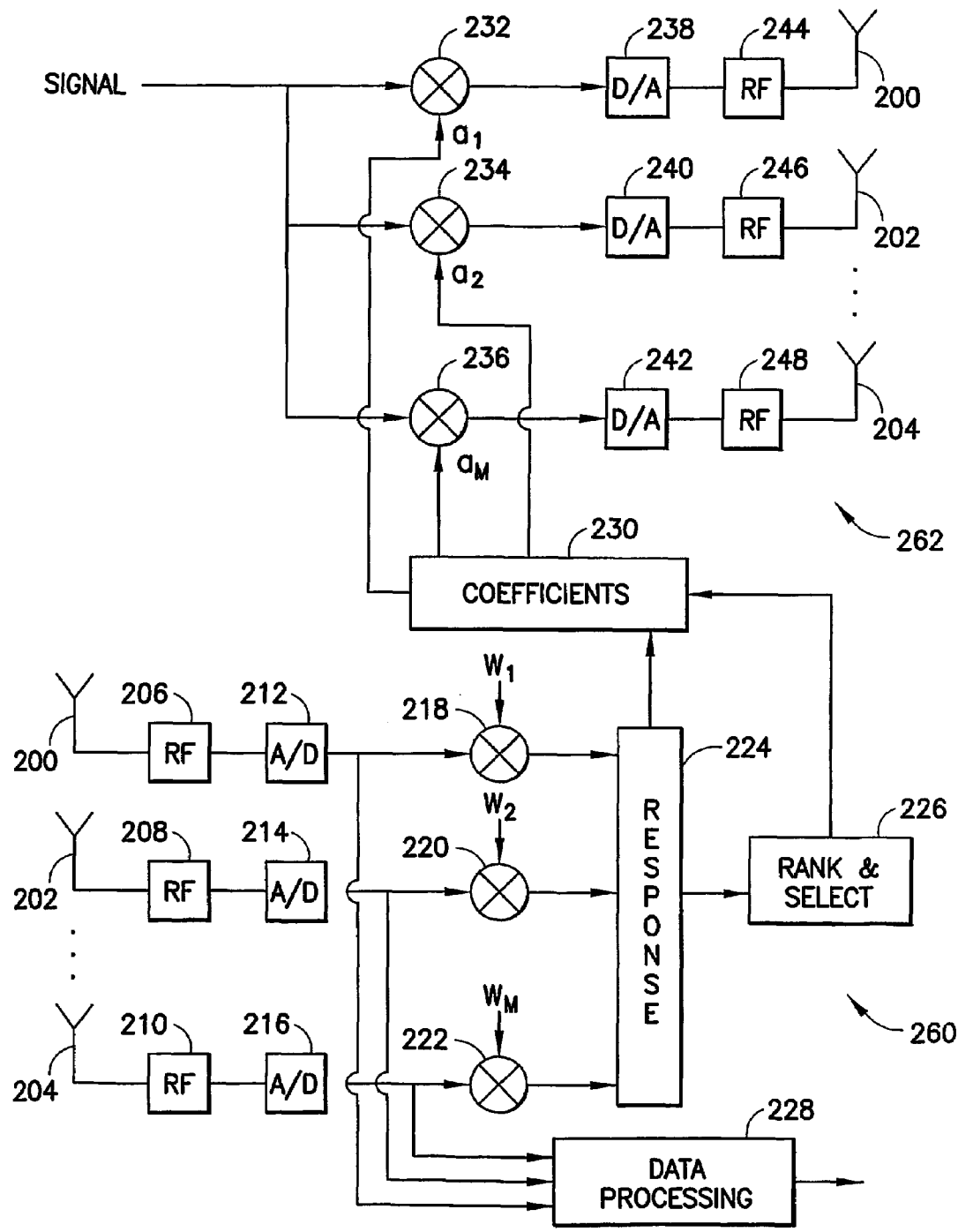
FIG. 1 illustrates in block diagram form a multiple antenna system according to the prior art.

Consider a multiple antenna system with t transmit antennas and r receive antennas, such as that illustrated in FIG. 1. Let us suppose that we wish to transmit at a spectral efficiency of R bits/sec/Hz. We denote the t×1 transmitted vector by X while the r×1 received vector is denoted by Y. The additive white noise vector is denoted by N while the frequency non-selective Rayleigh fading channel between the transmit antennas and the receive antennas is given by the r×t matrix H. With this notation, the received signal Y can be expressed as $$Y = HX + N. \quad (1)$$

The channel fading is assumed to be quasi-static over time; i.e., the channel remains constant within a frame while the channel realization is independent from frame to frame. We assume that the channel is known perfectly at the receiver. In practice, good channel estimates can be obtained at the receiver by employing preamble based training in the system. We also assume the existence of an error-free feedback channel from the receiver to the transmitter which carries B bits every frame. For simplicity, power adjustment over time; (i.e., temporal power control) is not performed.

We will first discuss unit rank beamforming schemes and analyze their performance. Unit rank beamforming schemes are optimal in the sense of minimizing outage probability in the important case when the number of receive antennas is restricted to 1. Further, we have shown that unit rank beamforming with multiple receive antennas is optimal in the sense of minimizing the pair-wise codeword error probability. Additionally, unit rank beamforming schemes result in simple decoding structures with low computational complexity.

We have shown that transmission along the dominant eigenvector of the channel minimizes the pairwise codeword error probability in the system. It has also been shown that the transmission along the dominant eigenvector of the channel maximizes received SNR while resulting in maximum diversity. We refer to this transmission strategy as the unit rank beamforming scheme.

It is an advantageous feature of the invention that the decoding complexity of the unit rank beamforming scheme is independent of the number of transmit antennas. Since there is a single stream of data (corresponding to the eigen channel with the best eigen value) the resulting encoder is a scalar encoder and hence independent of the number of transmit antennas. As a result, the corresponding decoder is also a scalar decoder and hence the decoding complexity is independent of the number of the transmit antennas. In contrast, space time codes encode across all the transmit antennas in a joint fashion, thus resulting in a vector encoder whose order is given by the number of transmit antennas. In such a case, the corresponding vector decoder's complexity is exponential in the number of transmit antennas.

Consider the example of a finite size beamformer codebook given by $C = \{C_1, C_2, -C_N\}$. We can show that the quantizer which minimizes the outage probability is given by $$\min_{C_i \in C} \|HC_i^\dagger\|_2^2, \quad (2)$$

where $\|.\|_2$ represents the $l_2$ norm on $C^t$. Hence, a given channel realization H will be mapped to the beamforming vector $C_i$ which minimizes expression (2). It can also be shown that as N gets large, the quantization rule given by (2) leads to the dominant eigenvector of the channel. This follows from the Rayleigh quotient, which states that $\|HV\|_2$ is maximized when V is the dominant eigenvector of $H^\dagger H$.

We can further establish a lower bound on the outage performance of the unit rank beamforming scheme when the beamforming codebook size is constrained to $N = 2^B$ vectors. In particular, for t transmit antennas and r=2 receive antennas, we can show that the outage probability of the system is bounded below as follows:

$$P_{out}(R, P) \geq 1 - N(1 + \gamma_0)e^{-\gamma_0} + \quad (3)$$

$$e^{-\gamma_1} \left( \sum_{k=0}^{2t-1} \frac{N(1+\gamma_0)(\gamma_1 - \gamma_0)^k - \gamma_1^k}{k!} \right) - Ne^{-\gamma_1} \gamma_0 \frac{(\gamma_1 - \gamma_0)^{2t-1}}{(2t-1)!}$$

Where $$\gamma_0 = \frac{2^R - 1}{P}$$

and $\gamma_1$ is a function of N, t and $\gamma_0$.

Hence, with the above quantization rule, all the beamformer constructions which were known for a single receive antenna can be adapted for multiple receive antennas also. The design criterion for good beamformer codebooks in the case of single receive antenna is therefore given by $$\min_C \max_{i,j:i \neq j} |\langle C_i, C_j \rangle|. \quad (4)$$

Under appropriate circumstances, the above design criterion is mathematically equivalent to the design criterion of unitary space time constellations for non-coherent constellations. Hence, all the constructions available for unitary constellation design can also be used for the beamformer design problem with the quantization metric given by (2).

Figure 2:
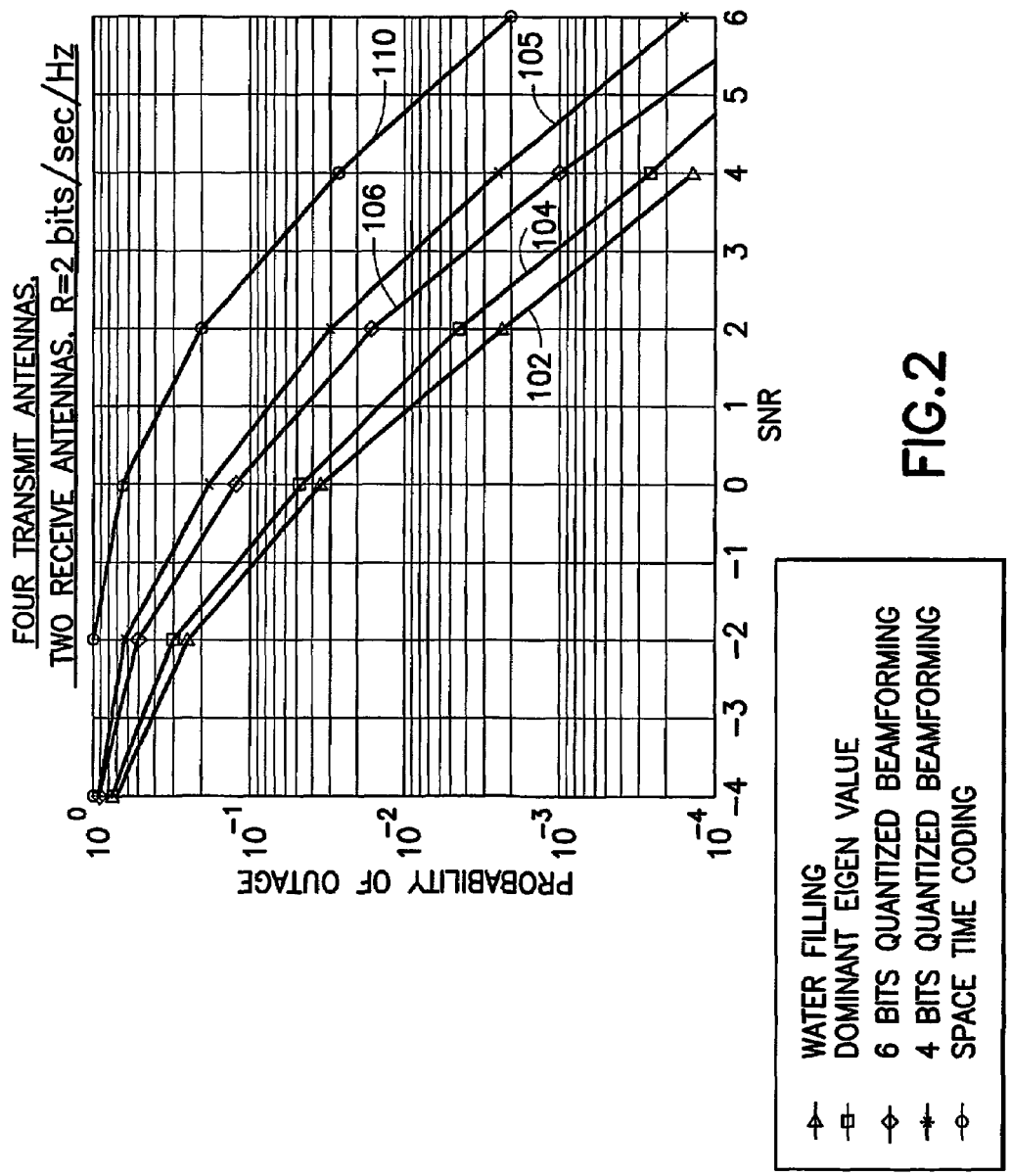
FIGS. 2-6 illustrate performance of various configurations.

FIG. 2 shows the performance of the quantized unit rank beamformers with four transmit antennas and two receive antennas transmitting at R=2 bits/sec/Hz (curves 104 and 106). The performances of a space-time coding scheme which does not use any channel state information (curve 110) as well as the spatial water-filling solution which requires complete channel state information (curve 102) are also given for comparison. With 6 bits of feedback information (curve 106), we see a gain of over 2.5 dB for the unit rank beamforming scheme over the space time coding scheme at an outage performance of $10^{-2}$. The gains increase further as the number of feedback bits is increased. Note that we can potentially gain up to 4 dB over space time codes using unit rank beamforming schemes. Further, the gap between the unit rank beamforming scheme (curve 104) and the higher rank water-filling scheme (curve 102) is less than 0.4 dB for this rate of transmission. The performance gains are in addition to significant reduction in complexity for the beamforming scheme over the space time coding as already explained. Further, the performance of dominant eigenvector beamforming (curve 104) which is the limit of the unit rank beamforming as the number of beamforming vectors gets large is also given in FIG. 2.

In the next section, we will present higher rank beamforming schemes (spatial water-filling) with finite rate feedback, which provide significant performance gains over space time codes as well as unit rank beamforming schemes when the transmission rate is increased (in particular, when $2^{R/r}/t<1$, where R is the rate of transmission, r is the number of receive antennas and t is the number of transmit antennas).

We now propose an algorithm to extend the unit rank beamforming approach for multiple receive antennas to a quantized spatial water-filling approach for the case of two receive antennas. The algorithm can be easily extended to the case of more than two receive antennas. Next generation handsets are expected to be equipped with no more than two antennas, due to size and cost constraints. Hence, the case of two receive antennas is important for downlink transmission in cellular systems.

For the case of a spatial water-filling solution, the transmitter needs to possess information about the eigenvectors as well as the eigenvalues of $H^\dagger H$. Note that the knowledge of the relative value of the eigenvalues (e.g. ratio of the eigenvalues) will not suffice for the water-filling power allocation. The invention employs a quantizer solution in which the eigenvectors and the power allocation vector are quantized independently. This separation imposes certain structure on the quantizer design, which advantageously reduces the complexity of implementation of the quantizer in practice.

In the case of two receive antennas (r=2), $H^\dagger H$ can at most have two non-zero eigenvalues. Hence, the knowledge at the transmitter should comprise these two eigenvectors (corresponding to non-zero eigenvalues) as well as the corresponding eigenvalues. The inventors have realized that significant savings in feedback resources can be obtained if the power allocation is made at the receiver and the information about the power distribution in the two eigen channels is passed back to the transmitter. Further, there is no loss in information if the power distribution vector $P_1$, $P_2$ is normalized to unity since the total power available (P) is known at the transmitter. Hence, we can design a computationally simple quantizer for the power allocation vector. Further, we have observed that a 2 bit quantizer effectively conveys all the information required for the power allocation at the transmitter. Additionally, we can gain up to one bit in feedback resources by noting that $P_1$ corresponding to the dominant eigenvector is always greater than or equal to $P_2$ corresponding to the other eigen channel. The quantizer for the power distribution vector is given in Table 1. Note that we set $P_2=k\,P_1$, where $0 \leq k \leq 1$, with $P_1 \geq 0.5P$, where 2 bits are used to describe k.

TABLE 1

Quantizer used for the power allocation vector in the case of 4 transmit antennas and 2 receive antennas.

| Water-filling solution | k |
|---|---|
| $0.75 \leq \dfrac{P_2}{P_1} \leq 1$ | 1 |
| $0.5 \leq \dfrac{P_2}{P_1} \leq 0.75$ | $\dfrac{1}{2}$ |
| $0.25 \leq \dfrac{P_2}{P_1} \leq 0.5$ | $\dfrac{1}{5}$ |
| $0 \leq \dfrac{P_2}{P_1} \leq 0.25$ | 0 |

Figure 3:
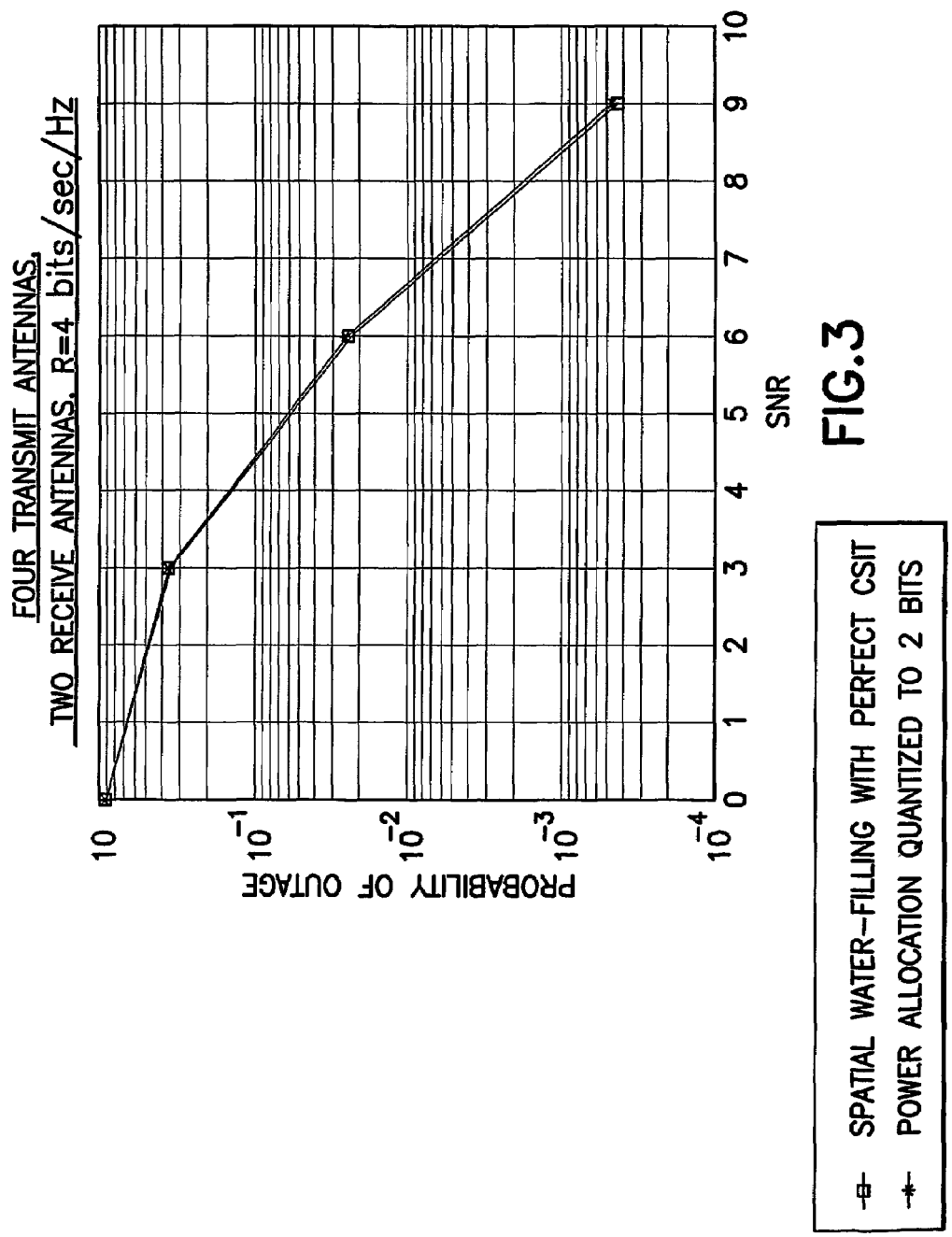
Figure 4:
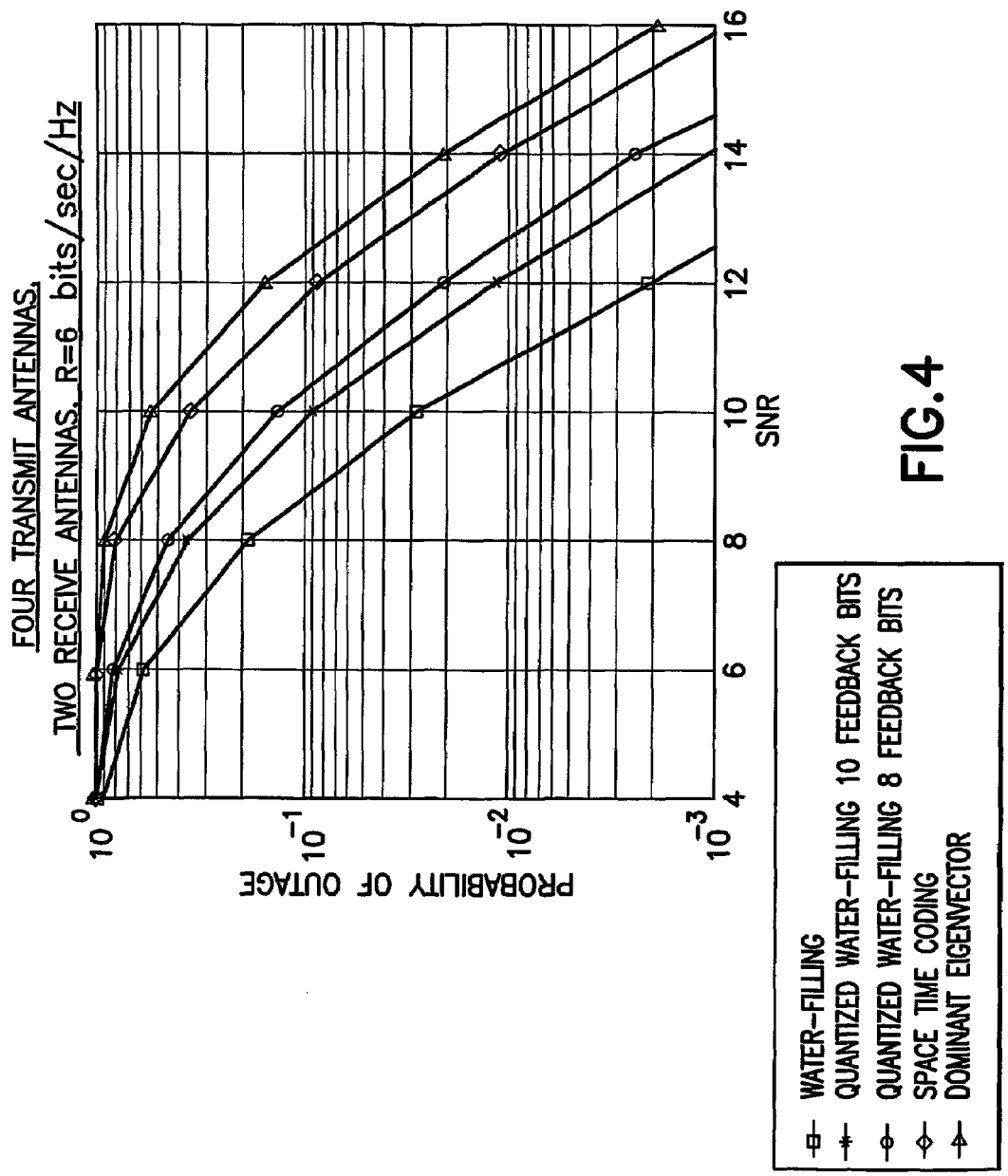

The effect of quantizing the power allocation vector to 2 bits as given in Table 1 can be seen in FIG. 3 for the case of 4 transmit antennas and 2 receive antennas. We assume that the eigenvectors are known perfectly at the transmitter for this simulation to study the effects of quantization of the power allocation vector. FIG. 3 shows the result of a two bit quantizer configured with perfect channel information. It can readily be seen that the two curves are essentially identical, so that the performance loss of the 2 bit power quantizer is negligible compared to the case of perfect channel state information.

We will now discuss the quantization of the two active eigenvectors of $H^\dagger H$. Consider a finite size beamformer codebook C of size N constructed as described in the previous section. We can first apply the quantization rule introduced in the last section to determine the best approximation to the dominant eigenvector among the available vectors in C. Note that the specification of this vector at the transmitter requires $\log_2(N)$ feedback bits. However, we can gain substantially in the specification of the second eigenvector by noting the following useful property.

Note that the eigenvectors of $H^\dagger H$ lie in $C^t$. Further, the eigenvectors are all mutually orthogonal. Hence, the specification of the first eigenvector determines the subspace which contains the second active eigenvector. In particular, the second eigenvector lies in the t-1 dimensional subspace which is orthogonal to the principal eigenvector. Hence, we can improve the description of the second vector significantly by constructing a second codebook in t-1 dimensions instead of the original t dimensional space.

However, it is not desirable to modify the composition of the codebook of the second eigenvector based on the first eigenvector, since the orthogonal subspace containing the second vector depends on the principal eigenvector. We therefore present an algorithm where both the beamformer codebooks are independent of the actual channel realization.

Let $C_1$ be a beamformer codebook in $C^t$ comprising of $N_1=2^{B_1}$ vectors. Similarly, let $C_2$ be a beamformer codebook in $C^{t-1}$ comprising of $N_2=2^{B_2}$ vectors. Let H be the channel realization, while $V_1$ and $V_2$ are the active eigenvectors of $H^\dagger H$. We first quantize $V_1$ in $C_1$ using the quantization rule discussed in the last section. In particular, we pick $C_i^1 \epsilon C_1$ (note that the superscript corresponds to the codebook index) such that $\|H(C_i^1)^\dagger\|_2$ is the maximum for all the vectors in $C_1$. Without loss of generality, we assume that $C_1^1$ maximizes the inner product with H among all the vectors in $C_1$.

Now, consider the vectors in $C_2$. We construct a codebook $C_2'$ from $C_2$ such that $C_2'$ lies in $C^t$. Hence, $C_2$ is an embedding of $C_2'$ in $C^{t-1}$. By construction, $C_2'$ is such that the first co-ordinate of all the vectors is set to zero. Hence, the vectors in $C_2'$ lie in the orthogonal subspace of the axis $[1, 0, \ldots, 0]$ of $C^t$. Further, the embedding rule of $C_2'$ into $C_2$ is that the first co-ordinate of $C_2'$ is dropped to obtain the corresponding vector in $C_2$. Hence, if $C_i^{2'}=[0,c_1,c_2,\ldots c_{t-1}]$, then the corresponding $C_i^2$ in $C_2$ is given by $[c_1,c_2,\ldots c_{t-1}]$.

Now, we make use of the property that $C_2'$ is in the orthogonal subspace of $e_1=[1,0,\ldots 0]$ in $C^t$. In particular, we rotate the vectors in $C_1$ such that $C_1^1$ coincides with $e_1$. Let A be a txt unitary matrix, constructed in a predetermined fashion from $C_1^1$ such that $AC_1^1=e_1$. Now, we rotate the channel matrix H by the same matrix A before we quantize the second vector. Equivalently, we rotate the second vector $V_2$ by the matrix A to give $V_2'=AV_2$. Now, we quantize $V_2'$ in the second beamformer codebook $C_2^{2'}$. Suppose $C_k^{2'}$ is the vector in $C_2^{2'}$ which maximizes the inner product with $V_2'$. Then, the transmitter gets the label k and the transmitter uses $A(C_2')^T$ for transmission, where the superscript T stands for matrix transpose operation. Note that A is a function of $C_1^1$ only and since the transmitter has information about $C_1^1$ via the feedback channel, the matrix A can be reproduced at the transmitter. Hence, both the resulting codebooks, $C_1$ and $C_2$ are independent of the actual channel realization.

TABLE 2

Table showing the decoding complexity as a function of the number of transmit antennas (t), receive antennas (r) and number of points in the modulation constellation (|Q|).

| Transmission scheme | Decoding complexity |
| --- | --- |
| Space time coding | $\propto r\|Q\|^t$ |
| Unit rank beamforming | $\propto r\|Q\|$ |
| Spatial water-filling | $\propto r\|Q\|^{\min(t, r)}$ |

Note that the quantized spatial water-filling solution requires joint coding and decoding across the active eigen channels. Hence, in the case of four transmit and two receive antennas which results in two active eigen channels, we will need joint coding across the two eigen channels. For instance, space time coding of rank 2 could be used to achieve the performance depicted in the next section. In the absence of channel state information, we would require a space time code of rank 4 corresponding to the four transmit antennas. Note that the decoding complexity of space time codes is exponential in the rank of the code. Hence, the quantized spatial water-filling solution results in significantly lower decoding complexity compared to the space-time coding, in addition to the benefits obtained in performance gains. The dependence of the decoding complexity on the number of transmit antennas and the number of receive antennas is shown in Table 2.

The performance of the quantized water-filling solution with 4 transmit antennas and 2 receive antennas is given in FIG. 3. The figure shows the performance of a quantized water-filling scheme in comparison with the perfect information water-filling scheme, space time coding and perfect information eigenvector beamforming, all transmitting at the rate of R=6 bits/sec/Hz. For the quantized beamforming scheme, we have used 2 bits for spatial power control information, using the quantizer given in table 1. We observe the performances of two different codebook constructions in FIG. 3. In the first case, the codebook $C_1$ was constructed in 4 dimensions with 16 vectors while the codebook $C_2$ was constructed in 3 dimensions with 16 vectors, thus requiring 3 feedback bits for each codebook. Hence, a total of 10 bits of feedback was used for this scheme. With 10 feedback bits, we note that we are just about 1 dB away from perfect feedback information while we obtain a gain of about 2 dB over space time coding. For the case of 8 feedback bits, we use 2 bits for spatial power control. Again, $C_1$ is in 4 dimensions, now with 8 vectors, while $C_2$ is in 3 dimensions with 8 vectors, thus requiring 3 bits each. With 8 feedback bits, we observe a gain of about 1.5 dB over the space time coding scheme. It should also be pointed out that the unit rank beamforming scheme performs worse than the space time code in this case.

The beamforming schemes for multiple transmit and receive antenna systems presented above apply when only partial channel state information is available at the transmitter. The unit rank beamforming solution results in a low complexity decoding structures as well as performance gains over channel agnostic space time coding schemes. An algorithm for implementing higher rank transmission schemes, such as a spatial water-filling solution, using low complexity quantizers has also been illustrated. In all the cases, a few bits of channel state information at the transmitter can lead to substantial performance gains as well as reduction in decoding complexity.

In the next section, we will show that the design of good beamformers for a multiple transmit and a single receiver system can be posed as the design of unitary space time constellations. The design of the unitary space time constellation is a dual problem of the design of good beamformers with the coherence time in the case of the unitary space time constellation given by the number of transmit antennas in the case of the beamformer design problem. Also, the number of transmit antennas in the equivalent unitary space time constellation design problem is set to unity (which is the number of receive antennas for the beamforming problem). We will establish the equivalence in the sequel and demonstrate the hitherto unknown use of unitary space time constellation as a beamformer with the help of an example. We will use the lower bound outage performance of beamformers for evaluating the performance of the unitary space time constellation as a beamformer.

Unitary space time constellations for multiple antenna systems were introduced by Marzetta and Hochwald in "Capacity of a mobile multiple-antenna communication link in rayleigh flat fading", IEEE Transactions on Information Theory, pp 139-157, January, 1999. In particular, they showed that the unitary space time constellations achieve the capacity of multiple antenna systems when the channel information is not available at both the transmitter and the receiver. The design criterion for unitary space time constellations to minimize the probability of pair-wise error probability was given in "Unitary space-time modulation for multiple-antenna communications in rayleigh flat fading", IEEE Transactions on Information Theory, vol 46, pp. 543-564, March 2000. A unitary space time constellation consists of signals $V_1, V_2, V_3, \ldots V_N$ where $V_i \in C^{T \times M}$. Here T is the block length of the code (less than or equal to the coherence time of the channel) and M has the interpretation of number of transmit antennas. Also, $V_i^\dagger V_i = I$ for each i, for unitarity. It was shown that the design criterion for good unitary space time constellations is to minimize $\delta$, where $\delta$ is defined as $$\delta = \max_{1 \leq l < l' \leq N} \|\Phi_l^\dagger \Phi_{l'}\|, \quad (1)$$

where the norm used above is a scaled Frobenius norm of a matrix, the scaling factor being given by M in this case.

Now consider the design of a good beamformer comprising N vectors for a system with n transmit antennas and a single receive antenna. It can be shown that the design criterion for good beamformers is $$\min_{C} \max_{1 \leq l < l' \leq N} |\langle C_l, C_{l'} \rangle|, \quad (2)$$

where $C_i \epsilon C_N$. The design criterion for unitary space time constellations given in (1) reduces to the design criterion of beamformers given in (2), if we set T=n and M=1 in (1). We see an equivalence between coherence time, in the unitary constellation design problem, and the number of transmit antennas, in the beamforming design problem.

Systematic Unitary Space Time Constellation as Beamformer

The design criterion for beamformers which was introduced in the previous section is quite general and an exhaustive computer search can be used to construct a good beamformer containing a given number of beamforming vectors. We now look at a particular way of designing these beamformers, viz., using a Fourier based approach for unitary space time constellations. Hochwald et al. in "Systematic design of unitary space-time constellations" IEEE Transactions on Information Theory, vol. 46, pp. 1962-1973, September 2000, considered the problem of imposing structure on the unitary space time constellations for easier encoding/decoding as well as to reduce the dimensionality of the search space during the design process. The equivalence of good beamformers with good unitary space time constellations established in the previous section reveals the hitherto unknown properties of the systematic constructions. We will show that the unitary space time constellations designed by Hochwald et al. The cited reference serve as good beamformers for the dual problem with the new meaning of the number of transmit antennas attached to coherence time as discussed above.

Consider the set of linear block codes defined by the K×T generator matrix U, whose elements are in $R_q$, ring of integers modulo-q. The code C represented by U comprises codewords $C_1$ given by $C_1$=lU, where l is a 1×K vector with elements taken from $R_q$. Thus, the size of the codebook is given by $|\delta|=q^K$. The codewords are mapped into signals by mapping the integers in the codeword into components of a complex signal via the transformation.

$$\phi(j) = \frac{1}{\sqrt{T}} e^{i\frac{2\pi}{q}j}, \quad j = 0, 1, \ldots q-1. \quad (3)$$

Finally, the unitary space time constellation is given by $$\Phi_l = \phi(C_l) \quad (4)$$

$$= \frac{1}{\sqrt{T}} \begin{bmatrix} [e^{i\frac{2\pi}{q}[C_l]_1}] \\ e^{i\frac{2\pi}{q}[C_l]_2} \\ \vdots \\ e^{i\frac{2\pi}{q}[C_l]_T} \end{bmatrix}, \quad 1 \leq l \leq N$$

Suppose, we wish to design a beamformer comprising of N=16 vectors for n=8 transmit antennas transmitting at 2 bits/sec/Hz and a single receive antenna. Then the corresponding dual problem of designing unitary space time constellation reduces to designing a codebook of size N=16 with a single transmit antenna (i.e., M=1) and coherence time given by T=8. One of the codes designed for this problem in the cited reference is characterized by U=[1 0 3 14 15 11 10 8], K=1 and q=16.

Figure 5:
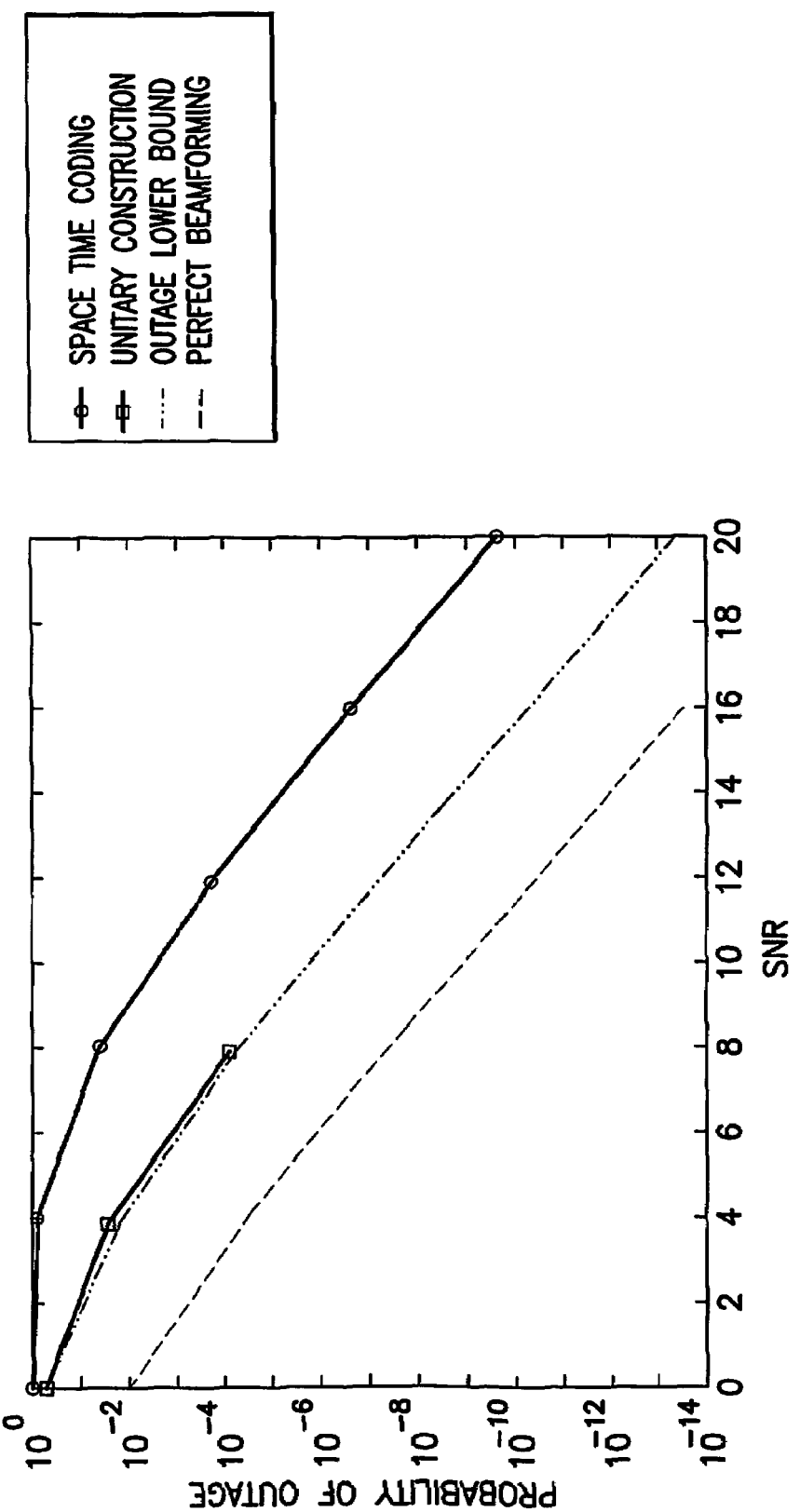

The performance of this beamformer is given in FIG. 5. The rate of transmission is R=2 bits/sec/Hz. The corresponding performance predicted by the lower bound on outage is also given in the figure. It can be seen that the performance of the constructed beamformer comes very close (less than 0.05 dB away) to the corresponding lower bound on outage probability. The performance of space time codes, which do not require any feedback information, is also given in the plots for reference. Note that there is gain of about 4 dB with 4 bits of feedback compared to the space time codes. It should also be noted that there will be gains from reduced receiver complexity also from the beamforming schemes which are not quantified in this document.

Figure 6:
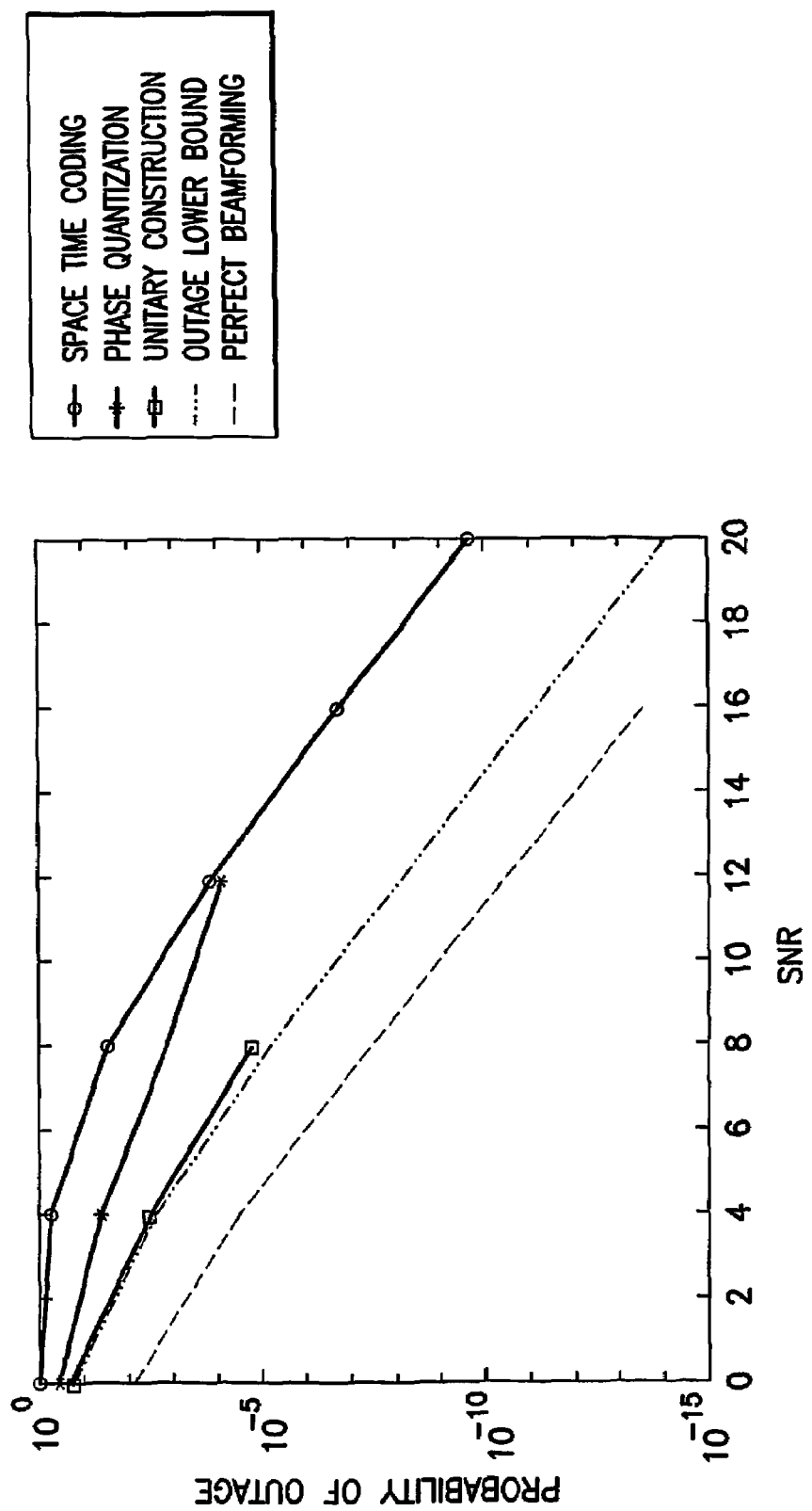

A similar construction taken from the cited reference again for n=8 transmit antennas and N=64 beamforming vectors is given in FIG. 6. The unitary space time constellation in this case is characterized by N=64, T=8, K=3, q=4 and U [$I_3$ U'], where $I_3$ is the 3×3 identity matrix and U' is given by $$U' = \begin{bmatrix} 2 & 3 & 3 & 3 & 0 \\ 2 & 0 & 3 & 1 & 1 \\ 0 & 3 & 2 & 3 & 3 \end{bmatrix} \quad (5)$$

For the case of 64 beamforming vectors, we present another straight-forward beamforming scheme for comparison. We use 1 bit to quantize the phase information of each one of the channel coefficients, leading to 8 bits in all, for 8 channel coefficients. The performance of this beamformer is also plotted in FIG. 6. It can be seen that the performance of the constructed beamformer is again less than 0.05 dB away from the corresponding bound. Further, the gain compared to the space time coding scheme now increases to about 6 dB. It can be observed from the plot there is lot of gain compared to the phase quantization scheme also. This shows that the systematic unitary space time constellations serve as very good beamformers. Some more constructions of the beamformers for n=8 transmit antennas can be obtained from the cited reference for the cases of N=133, 256, 529, 1296 and 2209 vectors.

We claim:

1. A method of forming a beam of a signal to be transmitted, the method comprising:
   providing a codebook (C) of parameters that modify a transmitted signal;
   providing a channel matrix (H) of parameters representing the properties of a channel;
   transmitting a signal from a base station along the channel using an antenna comprising at least two elements;
   receiving said transmitted signal in a mobile station and estimating a parameter in the channel matrix characteristic of the channel by selecting the value of a parameter in the codebook that minimizes a criterion;
   transmitting an indication of the selected parameter over the return channel; and
   applying the codebook entry associated with the selected parameter to subsequent transmissions from the base station, wherein when $2^{R/r}/t<1$, where R is a rate of transmission in bits/sec/Hz, r is a number of receive antennas, and t is a number of transmit antennas, a unit rank beamforming scheme is used, otherwise a higher rank beam forming scheme is used.

2. A method according to claim 1, in which an eigenvector of said channel matrix is provided by a calculation based on said parameter.

3. A method according to claim 2, in which said calculation is performed in said mobile station.

4. A method according to claim 1, in which said base station transmits a set of initial setup signals that are used by the mobile station to estimate the parameters of the channel.

5. A method according to claim 4, in which an eigenvector of said channel matrix is provided by a calculation based on said parameter.

6. A method according to claim 5, in which said calculation is performed in said mobile station.

7. A method according to claim 1, in which the signal is divided into frames and the process of estimating a parameter, transmitting an indication of the selected parameter and applying the codebook entry is repeated for each frame.

8. A method according to claim 7, in which an eigenvector of said channel matrix is provided by a calculation based on said parameter.

9. A method according to claim 8, in which said calculation is performed in said mobile station.

10. A method according to claim 1, in which said base station transmits a set of initial setup signals that are used by the mobile station to estimate the parameters of the channel.

11. A method according to claim 10, in which an eigenvector of said channel matrix is provided by a calculation based on said parameter.

12. A method according to claim 11, in which said calculation is performed in said mobile station.

13. The transceiver of claim 1 disposed within a mobile station.

14. A method of forming a beam of a signal to be transmitted, the method comprising:
  providing a codebook (C) of parameters that modify a transmitted signal:
  providing a channel matrix (H) of parameters representing the properties of a channel between a base station and a mobile station;
  transmitting a signal from the base station along two eigenvectors of a channel, the power allocation between said two eigenvectors being quantized independently from the quantization of the eigenvectors, in which $P_1 = kP_2$, where $0 \leq k \leq 1$, $P_1$ is the power in the dominant eigenvector, $P_2$ is the power in an other eigen channel, and k is selected from the group 1, ½, ⅕, and 0.

15. A method according to claim 14, in which the quantization of the power allocation is performed at the receiver.

16. A method according to claim 14, in which the dominant eigenvector is quantized by calculating the eigenvector in the relevant codebook that maximizes $\|H(C_i^{-1})^\dagger\|_2$.

17. A method according to claim 16, in which the second of two eigenvectors is calculated by finding that vector in an orthogonal subspace to the first eigenvector that maximizes the inner product with a beamformer codebook in the orthogonal subspace to the said relevant codebook.

18. A method according to claim 16, in which the quantization of the power allocation is performed at the receiver.

19. A method of constructing a beamformer, the method comprising:
  providing a unitary space-time constellation of at least one signal i having a coherence time T and one transmit antenna and applying the constellation as a set of at least one beamforming vectors in an array of T antennas, in which said set of at least one beamforming vectors have the form $V_j = 1/\sqrt{n} \exp(i2\pi j/N)$ where $j=0,1,2 \ldots N-1$, where j represents a particular beamforming vector, i denotes an imaginary number, n equals the number of transmit antennas, and N equals the number of beamforming vectors.

20. A method according to claim 19, the method comprising:
  providing a codebook (C) of parameters that modify a transmitted signal according to claim 19:
  providing a channel matrix (H) of parameters representing the properties of the channel;
  transmitting a signal from the base station along a channel using an antenna comprising at least two elements;
  receiving said transmitted signal in said mobile station and estimating a parameter in the channel matrix characteristic of the channel by selecting the value of a parameter in the codebook that minimizes a criterion;
  transmitting an indication of the selected parameter over the return channel; and
  applying the codebook vector associated with the selected parameter to subsequent transmissions from the base station.

21. A method of constructing a beamformer of N vectors, the method comprising:
  providing a transmitter system having n transmit antennas;
  forming a set of N functions in a unitary space time constellation with one antenna and a coherence time of n; and
  applying said set of N functions as a set of N beamforming vectors, in which said set of at least one beamforming vectors have the form $V_j = 1/\sqrt{n} \exp(i2\pi j/N)$ where $j=0,1,2 \ldots N-1$, where j represents a particular beamforming vector, i denotes an imaginary number, n equals the number of transmit antennas, and N equals the number of beamforming vectors.

22. A transceiver comprising:
  a receiver for receiving a first signal from a sender over a channel from at least two transmit antennas;
  a computer readable storage medium for storing a codebook C of parameter;
  circuitry coupled to the codebook and to the receiver for estimating a parameter of a channel matrix of the channel by selecting a value of a parameter in the codebook that minimizes a criterion; and
  a transmitter for transmitting to the sender an indication of the selected value of the parameter prior to receiving a second signal from the sender, wherein when $2^{R/r}/t < 1$, where R is a rate of transmission in bits/sec/Hz, r is a number of receive antennas, and t is a number of transmit antennas, a unit rank beamforming scheme is used, otherwise a higher rank beam forming scheme is used.

23. The transceiver of claim 22, wherein said circuitry further is for determining an eigenvector of said channel matrix based on the estimated parameter.

24. The transceiver of claim 22, wherein said circuitry estimates the parameter of the channel matrix using a set of initial setup signals received with the first signal.

25. The transceiver of claim 22, wherein the circuitry is for estimating a parameter of a channel matrix of the channel by selecting a value of a parameter in the codebook that minimizes a criterion for each frame of received signals.

26. A transceiver comprising: first circuitry for quantizing at least two eigenvectors for a signal to be transmitted;

second circuitry for quantizing a power allocation among the at least two eigenvectors in a manner that is independent of the quantizing the at least two eigenvectors; and a transmitter for transmitting the signal along the at least two eigenvectors with the quantized power allocation among the at least two eigenvectors, wherein the power for the dominant eigenvector is P1 and for a less dominant eigenvector is P2, the power allocation being P1=kP2; where k is selected from the group 1, 0.5, 0.2, and 0, wherein the first circuitry quantizes a dominant eigenvector of the at least two eigenvectors by calculating that eigenvector in a codebook C that maximizes $\|H(C_i^1)^{554}\|$ for a channel matrix H, wherein the first circuitry quantizes a non-dominant eigenvector of the at least two eigenvectors by finding that vector in an orthogonal subspace to the dominant eigenvector that maximizes an inner product with a beamformer codebook in the orthogonal subspace to the said codebook C.

27. The transceiver of claim 26, wherein the first circuitry comprises a receiver for receiving a wireless message that includes the quantized power allocation.

28. A transceiver comprising:
a receiver for receiving at least one signal i in a coherence interval T;
circuitry for applying a unitary space-time constellation of the at least one signal i as a set of at least one beamforming vectors in an array of T antennas, wherein the set of N functions are of the form $V_j=1/\sqrt{n} \exp(i2\pi j/N)$ where j=0,1,2 ... N-1, where j represents a particular beamforming vector, i denotes an imaginary number, n equals the number of transmit antennas, and N equals the number of beamforming vectors.

29. A transceiver comprising:
a plurality of n transmit antennas;
circuitry for forming a set of N functions in a unitary space time constellation with one antenna and a coherence time of n; and
a transmitter for applying said set of N functions as a set of N beamforming vectors to a signal to be transmitted, wherein the set of N functions are of the form $V_j=1/\sqrt{n} \exp(i2\pi j/N)$ where j=0,1,2 ... N-1, where j represents a particular beamforming vector, i denotes an imaginary number, n equals the number of transmit antennas, and N equals the number of beamforming vectors.

30. A computer readable medium embodied with a program of machine-readable instructions, comprising instructions for:
for a channel matrix that is representative of a channel over which a signal was received, estimating a parameter in the channel matrix by selecting the value of a parameter in a codebook that minimizes a criterion, wherein the codebook is also tangibly embodied on a computer readable medium, wherein when $2^{R/r}/t<1$, where R is a rate of transmission in bits/sec/Hz, r is a number of receive antennas, and t is a number of transmit antennas, a unit rank beamforming scheme is used, otherwise a higher rank beam forming scheme is used.

31. A computer readable medium embodied with a program of machine-readable instructions, comprising instructions for:
quantizing at least two eigenvectors of a channel;
receiving over a wireless channel an indication of power allocation among the at least two eigenvectors; and
transmitting a signal along the at least two eigenvectors using a power allocation consistent with the received indication, wherein quantizing at least two eigenvectors comprises calculating a dominant one of the two eigenvectors in a codebook that maximizes $\|H(C_i^1)^\dagger\|_2$, said codebook also tangibly embodied on an information bearing medium.

32. A computer readable medium as in claim 31, wherein quantizing at least two eigenvectors comprises calculating a non-dominant one of the two eigenvectors by finding that vector in an orthogonal subspace to the dominant eigenvector that maximizes the inner product with a beamformer codebook in the orthogonal subspace to the said codebook.

33. A computer readable medium embodied with a program of machine-readable instructions, comprising instructions for calculating a beamforming function in a unitary space time constellation, said beamforming function being of the form
$V_j=1/\sqrt{n} \exp(i2\pi j/N)$ where j=0,1,2 ... N-1, where j represents a particular beamforming vector, i denotes an imaginary number, n equals the number of transmit antennas, and N equals the number of beamforming vectors.

34. A system comprising:
a base station; and
a mobile station communicatively coupled to the base station through a channel, at least one of the base station and the mobile station comprising a transceiver comprising:
a receiver for receiving a first signal from a sender over the channel from at least two transmit antennas;
a computer readable storage medium for storing a codebook C of parameters;
circuitry coupled to the codebook and to the receiver for estimating a parameter of a channel matrix of the channel by selecting a value of a parameter in the codebook that minimizes a criterion; and
a transmitter for transmitting to the sender an indication of the selected value of the parameter prior to receiving a second signal from the sender, wherein when $2^{R/r}/t<1$, a unit rank beamforming scheme is used, otherwise a higher rank beam forming scheme is used, where R is a rate of transmission in bits/sec/Hz, r is a number of receive antennas, and t is a number of transmit antennas.

* * * * *

UNITED STATES PATENT AND TRADEMARK OFFICE
CERTIFICATE OF CORRECTION

PATENT NO. : 7,330,701 B2 Page 1 of 1
APPLICATION NO. : 10/533248
DATED : February 12, 2008
INVENTOR(S) : Mukkavilli et al.

It is certified that error appears in the above-identified patent and that said Letters Patent is hereby corrected as shown below:

In The Claims:

In Claim 26: Column 13, line 12, at the equation, please delete the equation and replace with -- $\left\lVert H(C_i^1)^\dagger \right\rVert_2$ --.

Signed and Sealed this

Fifth Day of August, 2008

JON W. DUDAS
*Director of the United States Patent and Trademark Office*